United States Patent [19]
Eriksson et al.

[11] Patent Number: 6,148,076
[45] Date of Patent: Nov. 14, 2000

[54] METHOD AND AN ARRANGEMENT FOR CONTROLLING THE OPERATING MODE OF A SUBSCRIBER LINE INTERFACE CIRCUIT

[75] Inventors: Hans Eriksson, Järfälla; Carl-Henrik Malmgren, Stockholm; Henrik Hellberg, Solna; Anders Emericks, Sundbyberg; Henrik Sandström, Stockholm, all of Sweden

[73] Assignee: Telefonaktiebolaget LM Ericsson, Stockholm, Sweden

[21] Appl. No.: 08/887,458

[22] Filed: Jul. 2, 1997

[30] Foreign Application Priority Data

Jul. 5, 1996 [SE] Sweden ................................... 9602679

[51] Int. Cl.[7] ............................... H04M 1/00; H04J 3/16
[52] U.S. Cl. .......................... 379/387; 379/413; 370/434; 364/180
[58] Field of Search ..................... 379/399, 413, 379/350, 377, 400, 93.01, 93.14; 326/37; 340/825.24; 364/180; 370/434

[56] References Cited

U.S. PATENT DOCUMENTS

| | | | |
|---|---|---|---|
| 4,287,563 | 9/1981 | Huston, Jr. .............................. | 110/100 |
| 4,456,991 | 6/1984 | Chea, Jr. et al. ....................... | 379/399 |
| 4,598,287 | 7/1986 | Osakabe et al. ..................... | 340/825.4 |
| 4,768,188 | 8/1988 | Barnhart et al. ....................... | 370/434 |
| 4,881,226 | 11/1989 | Lechner et al. ......................... | 370/434 |
| 5,228,081 | 7/1993 | Warner et al. .......................... | 379/399 |
| 5,323,460 | 6/1994 | Warner et al. .......................... | 379/399 |
| 5,592,508 | 1/1997 | Cooper ................................... | 375/355 |

*Primary Examiner*—Forester W. Isen
*Assistant Examiner*—Jacques M. Saint-Surin
*Attorney, Agent, or Firm*—Burns, Doane, Swecker & Mathis, L.L.P.

[57] ABSTRACT

In a method and an arrangement for controlling the operating mode of a subscriber line interface circuit by mode control signals from a control circuit which is connected to the subscriber line interface circuit, the subscriber line interface circuit includes at least one latch which is interconnected between the control circuit and the subscriber line interface circuit. The latch is adapted to latch the mode control signals received from the control circuit in response to latch enable signals received from the control circuit, and to apply those latched mode control signals to the subscriber line interface circuit to control its operating mode.

3 Claims, 2 Drawing Sheets

METHOD AND AN ARRANGEMENT FOR CONTROLLING THE OPERATING MODE OF A SUBSCRIBER LINE INTERFACE CIRCUIT

TECHNICAL FIELD

The invention relates to a method and an arrangement for controlling the operating mode of a subscriber line interface circuit.

BACKGROUND OF THE INVENTION

A subscriber line interface circuit (SLIC) is an analog integrated telephone line circuit which, in modern telephone systems, replaces a line transformer used in earlier systems. SLICs are mounted on so called line interface boards (LIB) in telephone switches and act as the interface between the telephone line/subscriber and the telephone switch.

The object of a SLIC is i.a. to supply the telephone line with current, detect whether the telephone is off-hook or on-hook, and to disconnect the ringing signal from the line when the called subscriber goes off-hook.

Normally, there are between two and sixteen SLICs on each line interface board. The great advantage of SLICs is that they are physically small and thereby do not require as much space as a transformer. This is particularly valuable since the number of subscribers continuously increases.

The SLICs have a digital control interface which makes it possible to control in which operating mode the respective SLIC is to operate. The operating mode of a SLIC is traditionally controlled from a control circuit, e.g. a microprocessor, via a direct line and three parallel data input lines. This means that, normally, each SLIC requires four dedicated lines from the control circuit. Since one SLIC is required for each subscriber, the lines on the line interface board where the SLIC are mounted, will occupy quite a space on the line interface board.

SUMMARY

The object of the invention is to reduce the space needed for the lines from the control circuit on the line interface boards on which the SLICs are mounted by reducing the number of lines.

This is attained according to the invention by means of a bus interface between the SLICs and the control circuit and an input for bus addressing of the SLICs from the control circuit.

In accordance with the method according to the invention for controlling the operating mode of a SLIC by means of mode control signals from a control circuit, instead of applying the mode control signals directly to the SLIC, the mode control signals are latched in the SLIC in response to latch enable signals. These latched mode control signals are then applied to the SLIC to control its operating mode.

In accordance with the arrangement according to the invention for controlling the operating mode of a SLIC by means of mode control signals from a control circuit, at least one latch is interconnected between the control circuit and the SLIC to latch the mode control signals received from the control circuit in response to latch enable signals received from the control circuit. These latched mode control signals are then applied to the SLIC to control its operating mode.

By using a parallel or serial interface between the control circuit and the SLICs, the number of lines on the line interface board will be greatly reduced. Thus, each line interface board can carry more SLICs than before. By latching the mode control signals in the SLICs, the control circuit will not constantly have to supply mode control signals to the SLIC, but will be able to perform also other tasks.

BRIEF DESCRIPTION OF THE DRAWING

The invention will be described more in detail below with reference to the appended drawing on which

DETAILED DESCRIPTION

Figure 1:
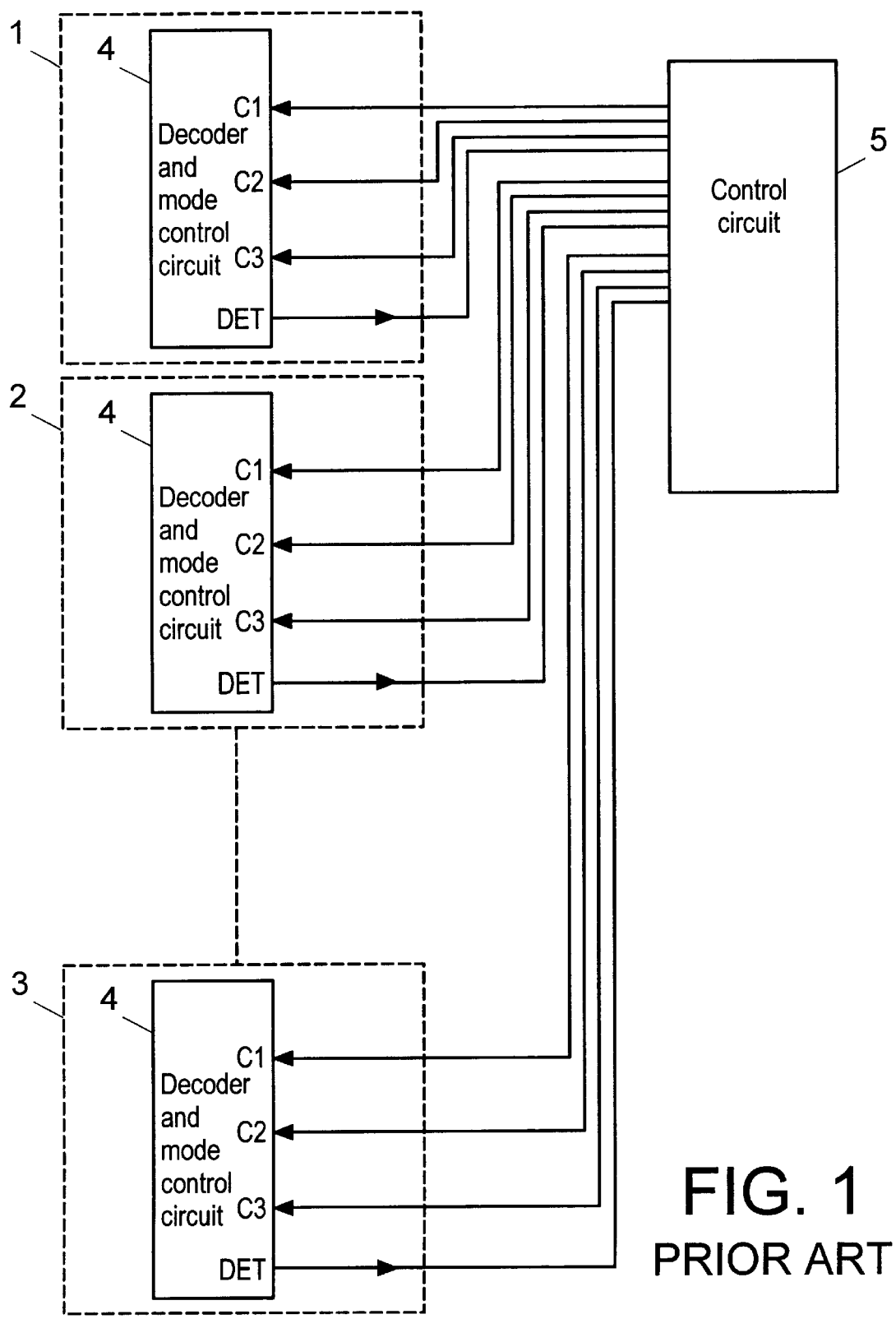
FIG. 1 shows a prior art line interface board with SLICs controlled by a control circuit.

In FIG. 1, three SLICs 1, 2 and 3 are shown on a line interface board (not shown). As indicated by broken lines, the line interface board comprises more SLICs than the three shown.

In a manner known per se, each SLIC 1, 2 and 3 comprises a number of different elements. To simplify the description, only a decoder and mode control circuit 4 is shown in each SLIC. The decoder and mode control circuits are identical in each SLIC and, consequently, bears the same reference numeral in each SLIC.

The operating mode of the SLICs 1, 2 and 3 is controlled by means of a control circuit 5, e.g. a microprocessor, via separate lines from the control circuit 5 to each decoder and mode control circuit 4. In the embodiment shown, there are three parallel data input lines from the control circuit 4 to corresponding data inputs C1, C2 and C3 of the respective decoder and mode control circuit 4.

In the decoder and mode control circuit 4, there are detectors (not shown) for monitoring the status of the telephone line connected to the respective SLIC 1, 2 and 3. These detectors are i.a. the off-hook detector which detects whether the telephone is on-hook or off-hook by monitoring the current which is supplied to the telephone line by the SLIC, a ring trip comparator which detects when the telephone goes off hook when a ringing signal is applied to the telephone line, and a ground key detector. The outputs of these detectors are connected to a single detector output DET on the decoder and mode control circuit 4. The detector output DET from the respective SLIC is connected to the control circuit 5 via a separate line for informing the control circuit 5 about the status of the respective SLIC.

As indicated above, each decoder and mode control circuit 4 is controlled from the control circuit 5 via three separate parallel data input lines to the data inputs C1, C2 and C3. A decoder (not shown) in the decoder and mode control circuit 4 senses the logical input levels on data inputs and sets the SLIC to a corresponding operating mode.

With separate lines from the control circuit 5 to each SLIC 1, 2 and 3, the lines will occupy a lot of space on the line interface card. The number of lines needed, actually restricts the number of SLICs that can be mounted on the line interface card. Thus, with the prior art arrangement shown in FIG. 1, several line interface cards have to be used when the number of subscriber increases. Of course, this increases the cost of the system.

Figure 2:
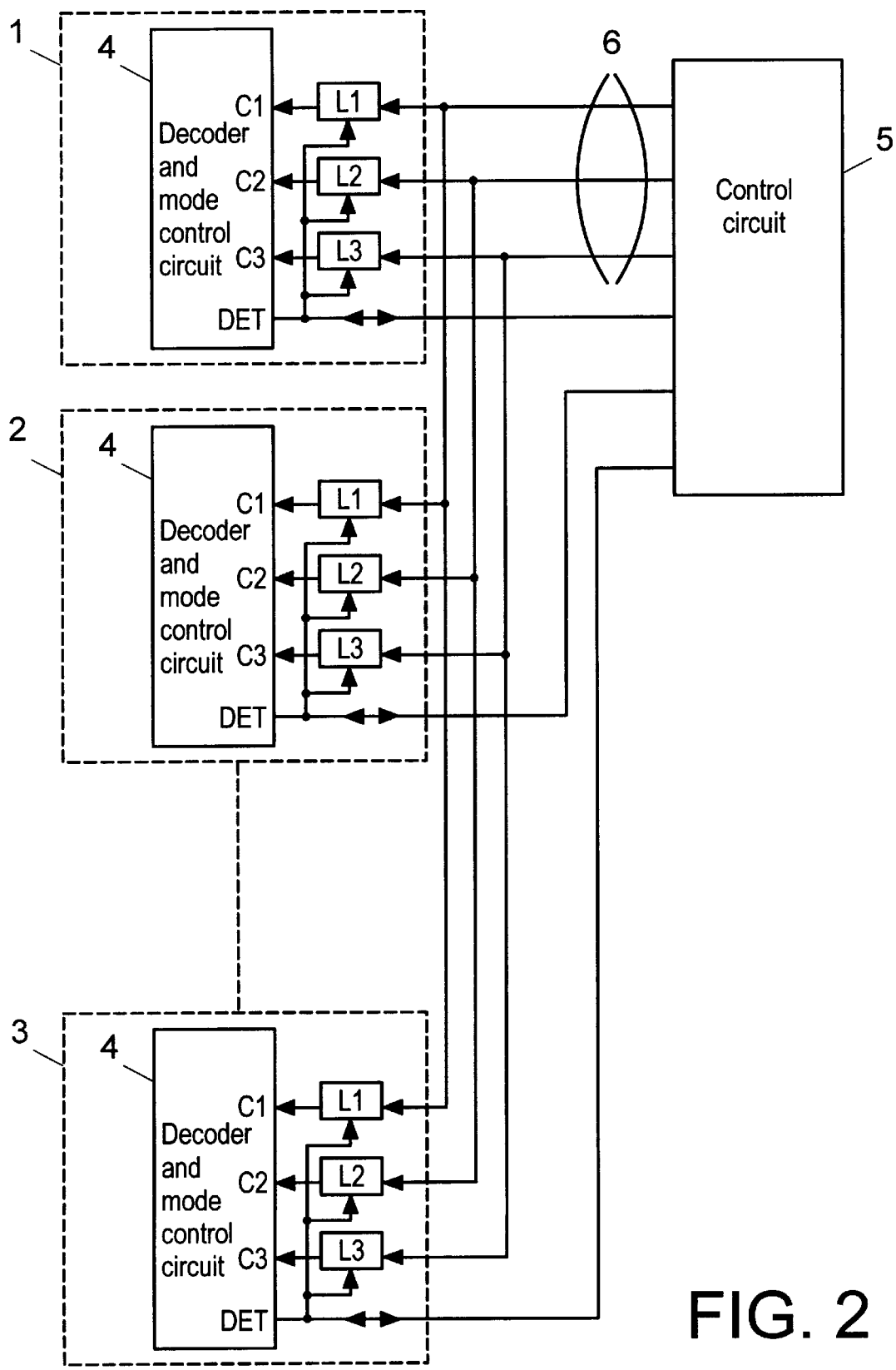
FIG. 2 illustrates an embodiment of an arrangement according to the invention.

FIG. 2 illustrates an embodiment of the arrangement according to the invention. In FIG. 2, reference numerals identical to those in FIG. 1 are used to denote elements that are identical to those in FIG. 1.

Thus, in FIG. 2, a control circuit 5 is used as in FIG. 1 to control the operating mode of SLICs 1, 2 and 3 via decoder and mode control circuits 4 in the respective SLIC as in FIG. 1.

However, in accordance with the invention, the control circuit 5 is connected to the respective decoder and mode control circuit 4 via a bus 6 which, consequently, is common to all SLICs on a line interface board. In accordance with the invention, the bus 6 is connected to the respective data input C1, C2 and C3 of the respective decoder and mode control circuit 4 via latches L1, L2 and L3. The latches L1, L2 and L3 are adapted to latch the mode control signals received from the control circuit 5 in response to latch enable signals also received from the control circuit 5 via the line to the detector output DET. These latched mode control signals are applied to the decoder and mode control circuit 4 until new mode control signals are received.

In the embodiment shown in FIG. 2 and as indicated above, the latch enable signals are received by the latches L1, L2 and L3 from the control circuit 5 via the detector output DET.

In a preferred embodiment, the SLICs 1, 2 and 3 on a line interface board comprise a decoder and mode control circuit 4, which has means for detecting the signals on the bus. In such an embodiment the detector output DET can be enabled to output signals only if a certain combination of bus signals is provided, for example all signals on the bus are high. Thus, the signals on the line to the detector output can be used for bi-directional signalling, which is controlled by the control circuit by means of output of different combinations of bus signals.

In accordance with another embodiment of the invention, the latch enable signals are received by the latches via a separate input terminal (not shown) of the SLIC.

In accordance with still another embodiment (not shown) of the invention, the bus or parallel interface may be replaced by a serial interface to further reduce the number of lines between the control circuit and the SLICs. In such an embodiment, the latches in the respective SLIC constitute e.g. the stages of a shift register. Serial data is received by each SLIC from the control circuit via a single data input line, while latch enable signals are received in the same manner as described above in connection with FIG. 2.

By the arrangement according to the invention, the number of lines between the control circuit and the SLICs on a line interface board will be greatly reduced. This will make it possible to increase the number of SLICs on line interface boards.

Also, by means of the latches according to the invention, the control circuit will not constantly be supplying the SLICs with data, but can perform other tasks since the data is latched until there is new data to be latched.

What is claimed is:

1. An arrangement for controlling an operating mode of a subscriber line interface circuit by mode control signals from a control circuit which is connected to the subscriber line interface circuit, comprising at least one latch which is interconnected between the control circuit and the subscriber line interface circuit, and which is adapted to latch the mode control signals received from the control circuit in response to latch enable signals received from the control circuit, and to apply those latched mode control signals to the subscriber line interface circuit to control its operating mode, and to receive the latch enable signals via a detector output terminal of the subscriber line interface circuit.

2. The arrangement according to claim 1, in which at least two latches are connected in series and adapted to receive the mode control signals via a common single line.

3. A line interface board, comprising a plurality of subscriber line interface circuits, an operating mode of which is controlled by mode control signals from a control circuit, wherein each subscriber line interface circuit comprises a plurality of latches which are interconnected between the control circuit and the subscriber line interface circuit, and the latches are adapted to latch the mode control signals received from the control circuit in response to latch enable signals received from the control circuit and to apply those latched mode control signals to the subscriber line interface circuit to control its operating mode, and the latches of each subscriber line interface circuit are series connected and adapted to receive the mode control signals via a common single line.

* * * * *